Oct. 14, 1930.   E. E. THUNE   1,778,175
METALLIC RECEPTACLE
Filed Feb. 12, 1929
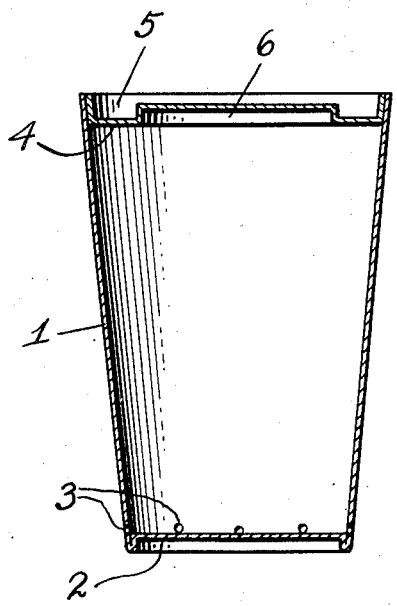
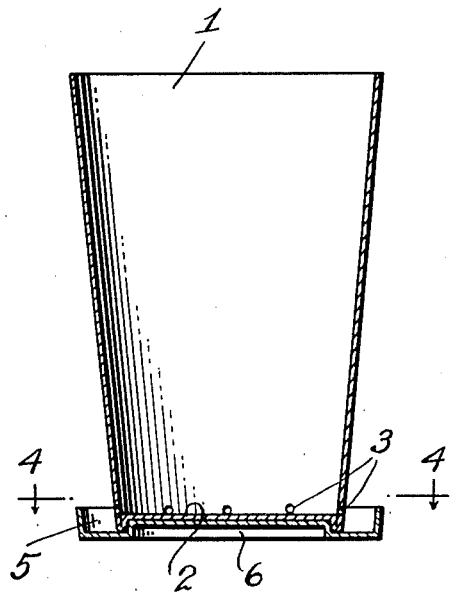
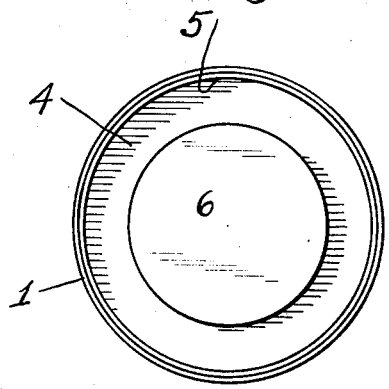
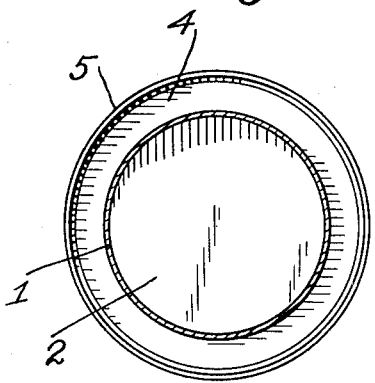
Inventor
Enoch E. Thune Patented Oct. 14, 1930

1,778,175

UNITED STATES PATENT OFFICE

ENOCH EMANUEL THUNE, OF KENYON, MINNESOTA

METALLIC RECEPTACLE

Application filed February 12, 1929. Serial No. 339,482.

The present invention relates to improvements in metallic receptacles and has reference more particularly to a container for food stuffs, said receptacle being capable of being used as a flower pot after the contents originally packed therein have been removed.

One of the important objects of the present invention is to provide a device of the above mentioned character wherein the lid will serve as a base or saucer for the flower pot in a postive and efficient manner.

It is a common practice to utilize an empty can in which food products have been originally packed as a flower pot but the lid serves no useful purpose in conjunction with the flower pot. It is therefore one of the principal aims of the present invention to provide a structure wherein the bottom of the receptacle will have cooperative relation with the lid to provide a rigid support for the flower pot at the same time afford a means for catching any water that may drain from the flower pot through suitable drain openings formed in the lower portion of the receptacle.

Still a further object is to provide a device of the above mentioned character which is simple in construction, inexpensive, strong and durable and further well adapted for the purpose for which it is designed.

Other objects and advantages of the invention will become apparent from the following description when taken in connection with the accompanying drawing.

In the accompanying drawing wherein like reference characters indicate corresponding parts throughout the same:

Figure 1 is a vertical sectional view through the container showing the lid in its position to provide a closure for the open top of the container.

Figure 2 is a top plan view thereof.

Figure 3 is a view similar to Figure 1 showing the device utilized as a flower pot, the lid being fitted on the bottom of the container, and Figure 4 is a transverse section taken approximately on the line 4—4 of Figure 3 looking downwardly.

In the drawing wherein for the purpose of illustration is shown the preferred embodiment of my invention, the numeral 1 designates an open top metallic receptacle or container, the same being shown in the present instance as tapering smaller toward its closed lower end. The bottom of the container is pressed inwardly to form a circular socket or depression 2, the purpose of which will be hereinafter more fully described. The container or receptacle is formed with a series of annular spaced drain holes 3 adjacent the bottom 2 as also clearly shown in Figure 1 for a purpose also to be presently described.

A removable lid 4 is provided for the open top of the container 1 and an annular rim 5 extends upwardly from the outer edge of this lid and this rim fits snugly within the upper portion of the container to provide a closure therefor as clearly shown in Figure 1 when the device is used for packaging food products.

A central portion of the lid 4 is pressed outwardly to form a central raised portion 6 that functions in the manner to be hereinafter more fully described.

A label bearing the packer's name and advertising indicia is pasted around the receptacle 1 and this label will cover the openings 3 so as to prevent the escape of the contents of the receptacle.

The lid 4 may be removed by inserting a knife or other sharp implement between the rim 5 and the adjacent face of the receptacle and the contents of the receptacle may be emptied, after which said receptacle may be utilized as a flower pot, as shown in Figure 3.

The lid 4 is adapted to be detachably secured to the bottom of the flower pot forming receptacle 1 by fitting the raised portion 6 snugly within the socket or depressed portion 2 as clearly suggested in Figure 3, and when the lid is placed upon a suitable support, the same will provide a base for rigidly supporting the flower pot in an upright position. Furthermore, the upstanding rim 5 will cause the lid to provide a saucer to receive or catch any water that may drain through the openings 3 when the plant that is placed in the receptacle 1 is watered. It is of course understood that the label that is originally around the can or receptacle is removed when the device is used as a flower pot and any decorative covering may be placed around the receptacle if so desired.

It will thus be seen from the foregoing description that I have provided a combined container and flower pot that will serve a two fold purpose and due to its simplicity, the container and lid may be readily and easily assembled or disassembled as well as constructed at a very low cost. While I have shown the lid as fitting within the upper portion of the receptacle to provide a closure therefor, the same may be constructed to fit around the upper open end of the receptacle and I do not wish to limit myself to the particular shape of the receptacle or lid.

If desired the receptacle can be manufactured without the drain holes, and after the contents have been emptied, holes may then be formed in the receptacle by the use of a nail or punch.

While I have shown the preferred embodiment of my invention it is to be understood that minor changes in size, shape, and arrangement of parts may be resorted to without departing from the spirit of the invention and the scope of the appended claim.

Having thus described the invention, what I claim as new and desire to secure by Letters Patent is:—

A combined container and flower pot comprising in combination, an open top receptacle tapering smaller toward its lower end, the bottom of the receptacle being formed with a circular depressed portion, a removable closure for the receptacle comprising a plate-like base having its central portion raised to form a circular projection having snug inner fitting engagement with the depressed portion when the closure forming member is placed against the bottom of the receptacle to provide a base for supporting same in an upright position, and an upstanding flared rim extending around the outer edge of the plate, said closure fitting entirely within the open upper end of the receptacle with the flared rim engaging snugly with the inner face of the upper open end portion of the receptacle, the lower portion of the receptacle being formed with drain openings.

In testimony whereof I affix my signature.

ENOCH EMANUEL THUNE.